US012755182B2

(12) United States Patent
Kurian et al.

(10) Patent No.: US 12,755,182 B2
(45) Date of Patent: Oct. 6, 2026

(54) PARTIAL QUANTUM MIRROR MODE FOR ARTIFICIAL INTELLIGENCE (AI) MODELS

(71) Applicant: Bank of America Corporation, Charlotte, NC (US)

(72) Inventors: Manu Kurian, Dallas, TX (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 412 days.

(21) Appl. No.: 18/611,021

(22) Filed: Mar. 20, 2024

(65) Prior Publication Data

US 2025/0299078 A1 Sep. 25, 2025

(51) Int. Cl.
*G06N 10/40* (2022.01)

(52) U.S. Cl.
CPC .................................... *G06N 10/40* (2022.01)

(58) Field of Classification Search
CPC ...................................................... G06N 10/40
See application file for complete search history.

(56) References Cited

U.S. PATENT DOCUMENTS

2023/0012373 A1* 1/2023 Moon ...................... H04L 63/20
2024/0370709 A1* 11/2024 Siebel ..................... G06N 3/044
2025/0047468 A1* 2/2025 Basson ................. H04L 9/0643

FOREIGN PATENT DOCUMENTS

CN 102713909 A * 10/2012 ......... G06F 16/9574

OTHER PUBLICATIONS

"Quantum Safe Cloud Computing Using Hash-based Digital Signatures", Zainab Iftikhar, Sep. 4, 2021, 26th International Conference on Automation and Computing (ICAC) (Year: 2021).*

* cited by examiner

*Primary Examiner* — Duan Zhang
(74) *Attorney, Agent, or Firm* — Weiss & Arons LLP

(57) ABSTRACT

Systems, methods, and apparatus are provided for remediating an AI hallucination and determining and limiting excessive branching. An AI query may be received at multiple processors including a quantum processor or at a quantum processor having multiple threads, and an AI search may be executed at multiple processors or on multiple quantum threads. A continuous hashing algorithm may hash the AI search data and partially mirrored AI search data and compare the hashes. When the hashes are not identical, the partially mirrored AI search data may be deleted. The AI search may be terminated and reinitiated at the last point the hashes are identical. The AI search data may be partially mirrored at the point that the search is resumed. The results of partial mirroring may be fed back to update the AI model.

20 Claims, 10 Drawing Sheets

TOFFOLI GATE

503

$$\begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{pmatrix}$$

MATRIX FORM

505

| INPUT | | | OUTPUT | | |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 0 | 1 |
| 1 | 1 | 0 | 1 | 1 | 1 |
| 1 | 1 | 1 | 1 | 1 | 0 |

TRUTH TABLE

PARTIAL QUANTUM MIRROR MODE FOR ARTIFICIAL INTELLIGENCE (AI) MODELS

FIELD OF TECHNOLOGY

Aspects of the disclosure relate to using quantum computing systems to partially mirror results of AI computer searches to monitor the results of artificial intelligence (AI) in real time and redirect AI operations if the results of partial mirroring diverge.

BACKGROUND OF THE DISCLOSURE

Quantum computing systems may provide tremendous advantages over standard (i.e., classical or binary) data processing and storage of standard computing systems. In standard computing, bits hold only one of two values, and the number of states is limited. In quantum computing, entangled qubits may hold all possible values at the same time, enabling many more states. As such, quantum computing systems may work much faster and handle much more data than standard computers. Quantum algorithms may create multidimensional computational spaces, allowing quantum computing to more efficiently solve complex problems that are beyond the reach of standard computing.

Generative AI models may include large language model (LLM) chatbots that are trained to use transformer-based deep neural networks. These models may be trained to predict strings of words or images that best match a request. Generative AI models may accept a natural language request as input and output generated content.

One risk associated with generative AI models is AI hallucination. The model may generate false or misleading information and present it inaccurately as fact. The model may find patterns or objects that are nonexistent and create outputs that are incorrect.

Conventional systems may attempt to minimize AI hallucinations by limiting the model, restricting the input data sets, using data templates, or regularly reviewing the system. However, none of these approaches are able to detect or mitigate an AI hallucination output in real time.

AI models may also sometimes provide divergent results for the same operations as the model may offer multiple possible paths or branches for proceeding. A decision may need to be made which of the branches may provide the best result.

It would be desirable to use the enhanced technical capabilities of a quantum computing system to identify AI hallucinations and redirect the model to remediate an incorrect output.

It would be desirable to be able to use the quantum computing system to detect branching and to assist in deciding in real time which of the multiple branches to select.

It would be desirable to be able to monitor performance of an AI system using partial mirroring of data in a quantum computing environment.

SUMMARY OF THE DISCLOSURE

Systems, methods, and apparatus may be provided for remediating AI hallucinations and addressing branching using a quantum computing system that uses a quantum processor. The systems, methods, and apparatus may be used to monitor an AI search in real time, to detect AI hallucinations and branching in the search results, and may be used to remediate the AI hallucinations, such as by deleting them.

The remediation may also use the detected AI hallucinations to attempt to determine the cause of the hallucinations and may provide feedback to the AI model to modify or redirect the AI model. The branching may be addressed, for example, by selecting a branch that is determined using the AI to be the most accurate branch.

A method for monitoring performance of an AI system using partial mirroring of data generated by the AI system using a quantum computing environment may be provided in accordance with the present disclosure. The method may include performing, by a first processor, a first AI operation using a first AI engine in response to a first search request to generate a first data stream that includes first data segments. The method may include performing, at a quantum computing system that includes a quantum processor, a second AI operation using a second AI engine in response to a second search request to generate a second data stream that partially mirrors the first data stream and includes second data segments that together may correspond to less than all of the first data stream. The first and second AI operations may be the same or the second AI operation may be a modification of the first AI operation so as to generate only a partial mirroring. An AI operation may be, for example, an AI search. A search request may include a query received from a user device. A search request may include a query that may be an automated query generated for testing purposes, such as with the use of AI.

The quantum processor may process data as a plurality of qubits. The first AI engine and the second AI engine may use a same AI model. Each of the first data segments and the second data segments may be associated with a respective time stamp such that the time stamp on one of the first data segments in the first data stream may match the time stamp on one of the second data segments in the second data stream.

The method may further include determining whether one or more of the second data segments are being partially mirrored or are diverging from one or more of the corresponding first data segments in the first data stream. The determination may include hashing a respective one of the second data segments to obtain a first hash value. The determination may include hashing a respective one of the first data segments that corresponds to the respective time stamp of the respective one of the second data segments to obtain a second hash value. The determination may include comparing the first and second hash values to determine whether the first and second hash values are matched or mismatched.

The first processor may be part of a classical computer. The first processor may be the same quantum processor or may be a second quantum processor. A single computer system may include a standard processor and a quantum processor.

The divergence of the results of the AI operation may be the result of an AI hallucination.

The first data stream may include first search results data and the second data stream may include second search results data.

The first and second hash values may be determined to be mismatched. If the hash values are mismatched, the method may include transmitting a prompt to the user device to deactivate further mirroring actions at the quantum computing system. When the first and second hash values are mismatched, the method may include continuing to partially mirror a portion of the first data stream on the quantum computing system. The method may include designating one or more of the one or more second data segments following the mismatched first and second hash values as a branch of the second data stream.

The method may include mirroring a part of the first data stream a second time on the first quantum computing system or on a second quantum computing system by performing a third AI operation to generate a third data stream. The method may include hashing a segment of the third data stream to obtain a third hash value. The method may include comparing the first and third hash values to determine a match or mismatch of the first and third hash values. When the first and third hash values are mismatched, the method may include designating one or more segments in the third data stream as associated with a second branch. The method may include determining by the user device whether to select one of the first and second branches to be reassociated with the data stream or to discard one or both the first and second branches.

The method may include continuous monitoring for matching or mismatching of the first and second hash values. The method may include placing one or more limits on the partial mirroring that is performed at the quantum computing system and controlling the second AI operation based on the one or more limits.

User access to a first portion of the first data stream may be restricted to a category or access level of users. The partial mirroring of the AI operation on the data stream may be performed by the quantum computing system only on a second portion of the first data stream that is unrestricted with respect to the category or access level of users.

One or more non-transitory computer-readable media storing computer-executable instructions, which, when executed on a processor on a computer system, perform a method for monitoring performance of an AI system using partial mirroring of data generated by an AI system using a quantum computing environment may be provided in accordance with the present disclosure.

The method may include performing, at a classical computer that includes a processor, an AI operation using a first AI engine in response to a first search request to generate a first data stream that includes first data segments. The method may include performing, at a quantum computing system that includes a quantum processor, the AI operation using a second AI engine in response to a second search request to generate a second data stream that partially mirrors the first data stream and includes second data segments that together correspond to less than all of the first data stream.

The AI operation may be, for example, an AI search. The first search request may include a query received from a user device. The first search request may include a query that may be an automated query generated for testing purposes, such as with the use of AI.

The quantum processor may process data as a plurality of qubits. The first AI engine and the second AI engine may use a same AI model and may be configured to perform the AI operation. Each of the first data segments and the second data segments may be associated with a respective time stamp.

The method may include hashing a respective one of the second data segments to obtain a first hash value. The method may include hashing a respective one of the first data segments that corresponds to the time stamp of the respective one of the second data segments to obtain a second hash value. The method may include comparing the first and second hash values to determine whether the first and second hash values are matched or mismatched. The method may include continuing to partially mirror in the second data stream on the quantum computing system the one or more of the first data segments in the first data stream. The method may include performing hashing on the one or more segments in the first data stream and on one or more of the second data segments in the second data stream to monitor whether results of the AI operation that is performed at both the classical computer and the quantum computing system are diverging.

The divergence of the results of the AI operation may be the result of an AI hallucination caused by the AI operation at the classical computer or the quantum computing system. The first request may include a query received from a user device. The first data stream may include first search results data and the second data stream may include second search results data.

If the first and second hash values are determined to be mismatched, the method may include transmitting a prompt to the user device to deactivate further mirroring actions at the quantum computing system. The method may include, when the first and second hash values are mismatched, continuing to partially mirror a portion of the first data stream on the quantum computing system, and designating one or more of the one or more second data segments following the mismatched first and second hash values as a branch of the second data stream.

The method may include mirroring a part of the first data stream a second time on the first quantum computing system or on a second quantum computing system by performing a third AI operation to generate a third data stream. The method may include hashing a segment in the third data stream to obtain a third hash value. The method may include comparing the first and third hash values to determine a match or mismatch of the first and third hash values. When the first and third hash values are mismatched, the method may include designating one or more segments in the third data stream as associated with a second branch. The method may include determining by the user device whether to select one of the first and second branches to be reassociated with the data stream or to discard one or both the first and second branches.

The method may include continuously determining by the classical computer or the quantum computing system whether the first and second hash values match. The method may include placing one or more limits on the partial mirroring that is performed at the quantum computing system, and controlling the second AI operation based on the one or more limits. User access to a first portion of the first data stream may be restricted to a category or access level of users. The partial mirroring of the AI operation on the data stream may be performed by the quantum computing system only on a second portion of the first data stream that is unrestricted with respect to the category or access level of users.

The system may include one or more computers, including a classical computer and one or more quantum computing systems. Each of the classical and quantum computing systems may include the same AI model for performing the AI operation with the expectation of generating the same data stream with the AI operation at each of the computers.

A first data stream may be generated by executing a query to generate results using AI and a second data stream may be generated by executing the query on the quantum computing system using the same AI. The first data stream may be generated on a classical computer or on the quantum computing system. The first and second data streams may be generated by executing an AI operation. The AI operation may be, for example, an AI search. The query may be generated by a user at a user device. The query may be an automated query generated for testing purposes, such as with the use of AI. The AI search may be executed at a classical computer using a classical processor and the same AI search may be executed at one or more quantum computing systems using a quantum processor. The query may be generated by an AI prompt. The quantum processor may operate in a mirror mode to attempt to mirror results from the classical computer on the one or more quantum computing systems. The mirror mode may utilize a plurality of entangled qubits in a state of superposition.

A full or partial mirroring of the data in a first data stream may be performed. The mirroring may be of a data stream generated on a classical computer on a quantum computing system. Or the mirroring may be of a data stream generated on a quantum computing system to a second data stream on the quantum computing system.

In embodiments, a partial mirroring of the data stream may be performed. The partial mirroring may mirror a slice of the data, rather than all of the data, or may mirror, for example, a base data layer, but not an enhanced data layer. The partial mirroring of data, rather than a full mirroring of data, may be beneficial to minimize resource usage.

The partial mirroring may only be needed, such as when only a limited set of the search results data to be made available to a user. For example, a user or a category of users may only be authorized to access a portion of a data stream, only a limited mirroring of data may be needed as only the data that the user or category of users is authorized to access may need to be verified by mirroring. The other data that the user or category of users is unauthorized to access need not be mirrored as this other data may be unused.

The partial mirror mode may partially mirror the AI query and execute a partially mirrored AI search. The partial mirroring may be performed by selecting a query and limiting the mirroring of the results, such as by the number of results that are mirrored. The partial mirror mode may include a continuous hashing algorithm. The hashing algorithm may generate hashes from the output AI search results and hashes from the output mirrored AI search results. The partial mirror mode may determine whether a hash of a portion of the AI search data is identical to a hash of the corresponding portion of the AI search data that has been partially mirrored.

When the hashes of the partially mirrored AI data, such as search results that are output, are identical, the partial mirroring may be enabled to continue. When the hashes of the partially mirrored AI search results are not identical, the AI-based operation may be paused, and the non-mirrored data may be analyzed as to whether the mismatching of the data streams at the classical computer and the quantum computing system are due to possible AI hallucination or branching. Where the non-matching of the partially mirrored data stream at the quantum computing system is determined to result from an AI hallucination, the partial mirroring may be terminated, and the partially mirrored data stream may be deleted. Where the partially mirroring is terminated, and the partially mirroring of the data stream, may resume from the last point that the hashes of the outputs were identical.

The point at which the partial mirroring resumes may be considered as a branch off of the previously partially mirrored data in the data stream that matched. In some embodiments, the partial mirroring may not be terminated, and the partial mirroring may continue and the point of a divergence between the data streams may be tracked. The point of divergence may be tracked as a new inception point of a branch. The data streams at the classical computer and the quantum computing system may include time stamps. The point at which the hashes of the outputs were identical may be identified by one of the time stamps.

A quantum circuit at the quantum processor may be initialized to operate the hashing algorithm. When the AI-based operation, such as a search based on an AI query is complete, the quantum circuit may be collapsed. The quantum processor may have N qubits, where N is a number between two and ten thousand. The continuous hashing algorithm may utilize a superposition property of the N-qubit processor.

The branching may be used to analyze the AI model used for the AI operation and to use machine learning (ML) to modify the AI model such that the data streams generated by the classical computer and the quantum computing system match in future testing using full or partial mirroring.

Partial mirroring may be performed simultaneously on more than one quantum computing system. In this case, simultaneous branches may be generated at multiple quantum computing systems. Where the branching generated at the multiple quantum computing systems is not identical, one of the classical or quantum computing systems may determine, such as with as a second AI operation, which of the branches to be selected for use in the AI model.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
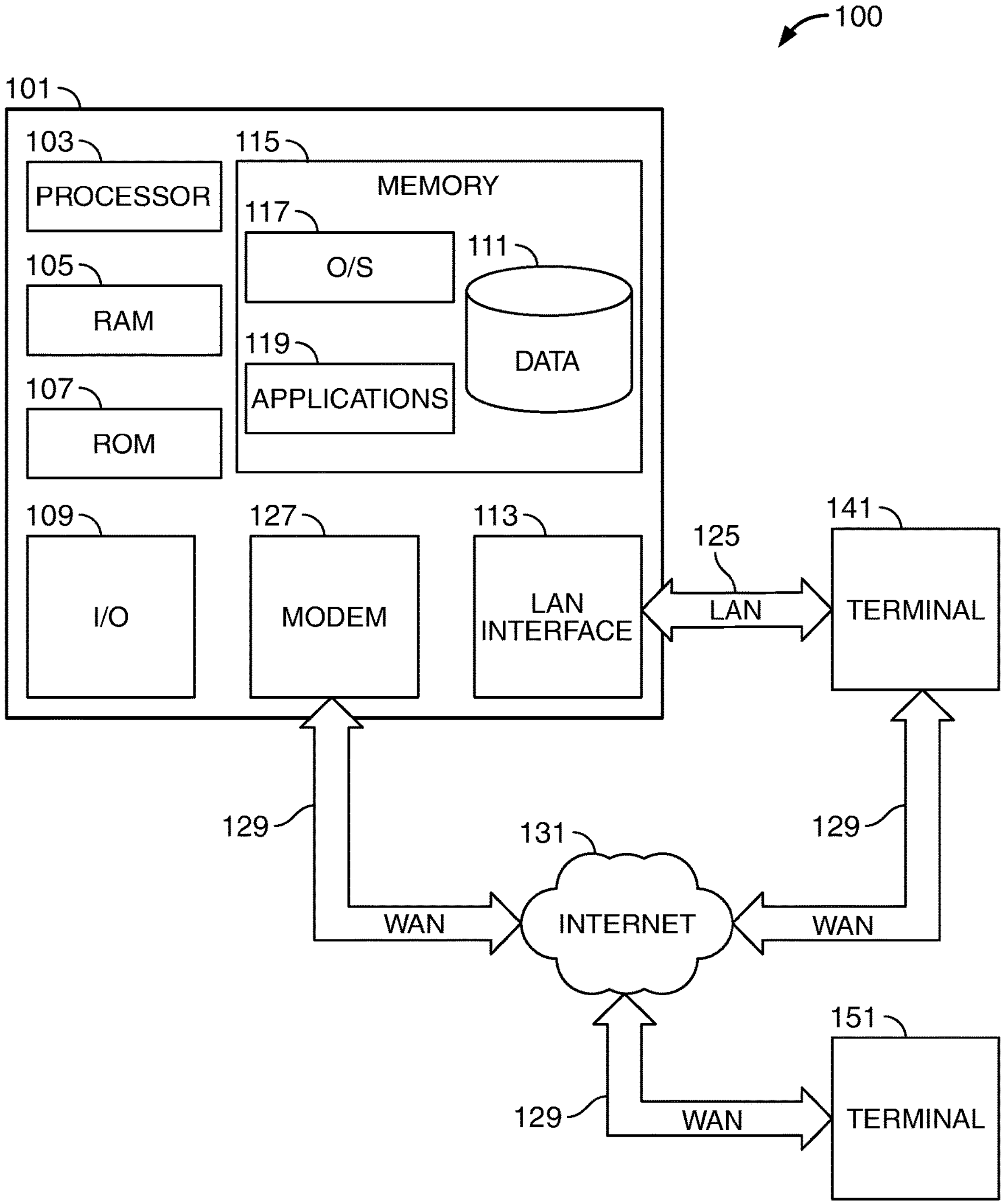
FIG. 1 shows illustrative apparatus in accordance with principles of the disclosure.

Systems, methods, and apparatus are provided for partially mirroring a data stream using a quantum computing system, such as to monitor AI hallucinations or preventing excessive branching.

For the sake of illustration, the invention will be described as being performed by a "system." The system may include one or more features of apparatus and methods that are described herein and/or any other suitable device or approach.

The system may include a standard processor, which is a non-quantum processor, used for binary computing. The system may include a quantum processor. A quantum processor may be used herein to refer to a computing device whose operations can harness aspects of quantum mechanics, such as superposition, interference, and entanglement.

Quantum processors are associated with vastly improved efficiencies over standard computers. Standard computers represent data in bits, which can be either 0 or 1. Quantum processors use qubits which utilize superposition (i.e., the ability to be in multiple states at the same time) to allow for a state of 0, 1, or any probability of being 0 or 1. The probabilities may be manipulated using matrix-based quantum gates, which are analogous to standard logic gates. Qubits are therefore able to represent many more data possibilities than a bit-based system of the same size. This allows for greater speed and less memory usage than standard systems.

A qubit in a state of superposition may not have a defined value because it may hold many potential values at the same time. When measured, the qubit wave function collapses to a defined state. When an entangled qubit is in a state of superposition, each of its entangled connections is also in a state of superposition. These combinations of uncertainties exponentially increase the power of quantum processors.

The quantum processor may include a default number of quantum threads. Each quantum thread may include a default number of quantum circuits. Quantum circuits may refer to hardware and software based computational models that include quantum gates and are used for executing quantum computations.

In some embodiments, at least one of the quantum circuits may include a Toffoli gate. A feature of the Toffoli gate is its universal nature, meaning the structure is able to represent standard operations as well as quantum operations. In some embodiments, at least one of the quantum circuits may include a Hadamard gate. A feature of the Hadamard gate is the ability to represent a superposition state.

Quantum computing may be referred to as the use of quantum-mechanical phenomena such as superposition and entanglement to perform computations. The smallest bit in a quantum computing system may be called a qubit.

Executable instructions may be executed by an "N"-qubit processor on a computer system. "N" may be a number between two and ten thousand.

The amount of data that a quantum computing system may be able to hold and manipulate may grow exponentially with the number of qubits included in the quantum computing system's processing core. A quantum computing system with "N" qubits may be able to simultaneously represent $2^N$ states. Therefore, two qubits may hold four states, three qubits may hold eight states, fifty qubits may hold 1,125, 899,906,842,624 states, and 10,000 qubits may hold $2^{10000}$ states.

Other standard components of a computer system may be present, such as communication links, displays, input and output devices, read-only and random-access memory, and other components.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The non-transitory memory may be configured to store executable data configured to run on the "N"-qubit processor and/or a standard processor.

The "N"-qubit processor or standard processors may control the operation of the computer system and its components, which may include RAM, ROM, an input/output module, and other memory. Standard microprocessors or standard processors may refer to non-qubit processors.

Other components commonly used for computers, such as EEPROM or Flash memory or any other suitable components, may also be part of the apparatus and computer system.

A communication link may enable communication with other computers and servers, as well as enable the program to communicate with databases. The communication link may include any necessary hardware (e.g., antennae) and software to control the link. Any appropriate communication link may be used, such as Wi-Fi, Bluetooth, LAN, and cellular links. Multiple communication links may be present. In some embodiments, the network used to communicate may be the Internet. In some embodiments, the network may be an internal intranet or other internal network.

Generative AI is artificial intelligence technology that produces various types of content, including text, images, audio, and synthetic data. In some instances, the AI algorithms may produce incorrect results that are not based on training data or are incorrectly decoded by a transformer model. The AI algorithm may present these incorrect results as fact, a phenomenon known as AI hallucination.

AI models may also produce false information in response to an attack by a bad actor. For example, a bad actor may manipulate the output of an AI model by subtly adjusting the input data. For image recognition algorithms, an adversarial attack might involve adding a small amount of noise to an image, causing the AI to misclassify it.

The system may use a quantum processor in a continuous or substantially continuous mirror mode to identify and correct AI hallucinations.

Data mirroring refers to generating an exact copy of a data set in real time. Data mirroring may involve copying the data from one location to a local or remote storage medium. Data mirroring may involve copying the data to different partitions of the same disk or to separate disks within the same system. When each system has a separate hard drive controller card, the process may be known as disk duplexing. Partial mirroring may involve mirroring less than all of the data.

In some embodiments, data mirroring may not involve copying data from one location to another. Rather, data mirroring may be initiated by running the same search operation on different computing systems and expecting to generate the same search results in response to the search operation at each of the different computing systems. In these embodiments, partial mirroring may involve mirroring less than all of the data at a different computer system.

A classical (standard) computer may be used to activate a mirror mode in which an AI search is run. The AI search may be initiated by a user entering an AI prompt, such as text, which an AI generator may use to generate an output that may be used to run an AI search. The text may be in the form of a user query. The AI prompt may be entered on the classical computer or on a quantum computing system. The AI search that is run on the quantum computing system to attempt to mirror the data generated at the classical computer on the quantum computing system or to mirror a search on the quantum computing system on the quantum computing system or on another quantum computing system.

In some embodiments, a quantum processor of a quantum computer may activate only at the quantum computer, without involvement of a classical computer. In mirror mode, the quantum processor may mirror an AI prompt and execute a mirrored AI search to generate an output for the user query. In some embodiments, the system may generate more than one copy mirrored copy of the AI prompt. The system may monitor the results returned for each mirrored copy of the AI prompt. The results for each mirrored copy of the AI prompt may be a data stream. The results for each mirrored copy of the AI prompt may match or may not match.

In the mirror mode, the quantum processor may continuously or substantially continuously hash the output for the original AI search and the outputs for each mirrored copy of the AI search. The quantum processor may compare the hash values. The enhanced speed and capacity of quantum computing may enable continuous hashing for both the original search and the mirrored copy and continuous comparisons between the hash values.

The comparison of hash values may confirm the integrity and consistency of the AI search results. If the hash values are identical, the underlying data may be assumed to be identical as well. If the hash values are not identical, the underlying data may be assumed to diverge.

An AI hallucination in one copy of the mirrored query or partially mirrored query may cause a mismatch between the hashes. In response to detection of the mismatch, the system may take steps to remediate the hallucination.

If a hallucination is identified by the mirroring, the system may return the query to the inception point of the hallucination. The inception point may be identified as the last time the hash values were identical. The inception point may be identified by a time stamp associated with the AI search. The system may create a new mirrored copy of the AI search data starting at this inception point. The system may enable the AI search to proceed from this inception point. In some embodiments, the system may terminate the AI search and reinitiate the search at the inception point. In some embodiments, the system may pause the AI search and resume the search from the inception point.

In some embodiments, a query at a classical computer or an AI prompt at a quantum processor at a quantum computing system may be used to activate a partial mirror mode at the quantum computing system. In partial mirror mode, the quantum processor may execute a partially mirrored AI search at the quantum computing system to duplicate as search results a subset (i.e., less than all) of the data that is generated by a search at the classical computer or by another AI prompt at the quantum computing system. A partial mirroring of the data may be generated in different ways, such as by adding one or more search terms or a restriction to the query that generates the mirrored version of the data. For example, the restriction may restrict the search results to only data that is limited to a first level of security. In this example, data tagged as having a second, higher level of security may be excluded from the partially mirrored search results. In some embodiments, the system may generate more than one copy of the AI prompt. The system may monitor the results returned for each partially mirrored copy of the AI prompt.

The partial mirroring may be used in certain circumstances, such as when only a limited set of the search results data are to be made available to a user. For example, a user or a category of users may only be authorized to access a portion of a data stream, only a limited mirroring of data may be needed as only the data that the user or category of users is authorized to access may need to be verified by mirroring. The other data that the user or category of users is unauthorized to access need not be mirrored as this other data may be unused.

In partial mirror mode, the quantum processor may continuously or substantially continuously hash the output of segments in a portion that is less than all of the results of the original AI search with a hash of the outputs of segments in each partially mirrored copy of the AI search. The quantum processor may compare the hash values. The enhanced speed and capacity of quantum computing may enable continuous hashing for both the original search and the partially mirrored copy and continuous comparisons between the hash values.

The comparison of hash values may confirm the integrity and consistency of the AI search results. If the hash values are identical, the underlying data may be assumed to be identical as well. If the hash values are not identical, the underlying data may be assumed to diverge.

An AI hallucination in one copy of the partially mirrored query may cause a mismatch between the hashes. In response to detection of the mismatch, the system may take steps to remediate the hallucination.

The system may return the query to the inception point of the hallucination. The inception point may be identified as the last time the hash values were identical. The inception point may be identified by a time stamp associated with the AI search. The system may create a new partially mirrored copy of the AI search data starting at this inception point. The system may enable the AI search to proceed from this inception point. In some embodiments, the system may terminate the AI search and resume or reinitiate the search at the inception point.

Another issue that may arise with regard to generative AI tools is excessive branching. Branching refers to adding new child nodes to a search tree. Horizontal branching may expand options at the same level and vertical branching may expand options at deeper levels.

A branching factor parameter may be associated with the AI search. The branching factor may determine the number of permitted nodes. For example, AI-based natural language processing may involve parsing sentences. The branching factor may dictate the number of possible grammatical structures for a sentence.

A high branching factor may allow AI algorithms to explore diverse options and consider a broader range of possibilities. However, high branching factors may require significant memory and processing power which may slow down the system. In some cases, a very high branching factor can lead to excessive exploration which may take the search off-track and return inaccurate results. The branching factor may therefore be maintained at a relatively low value, for example, at 2-3 branches, to throttle the AI model and limit use of resources.

In some embodiments, the quantum processor may analyze the branches at predetermined points. The predetermined points may be at regular time intervals or random time intervals. In some embodiments, the quantum processor may analyze the branches when the branching exceeds a branching factor. In some embodiments, the standard processor may analyze the branches.

Based on branch content and/or the original user query, one of the processors, whether the standard processor or the quantum processor, may identify the branches most likely to output accurate query results. The system may select a set of branches to continue. The system may terminate the remaining branches that are not selected. The system may mirror the search data from this point for each branch that is allowed to continue. The mirroring may be a full mirroring or a partial mirroring of the data for each branch.

In some embodiments, the quantum processor may analyze the branches in response to a mismatch between the hashes. The mismatch may be between a hash of a portion of the first data stream at the classical computer or the quantum computing system and a portion of the second data stream at the quantum computing system. Excessive branching in one copy of the mirrored query may be one of the causes of a mismatch between the hashes. In response to detection of the mismatch, the system may return the query to the inception point of the excessive branching. The inception point may be identified as the last time the hash values are identical. The quantum processor may analyze the branches at the inception point. Based on branch content and/or the original user query, the quantum processor may identify the branches most likely to output accurate query results. The system may select a set of branches to continue. The system may terminate the remaining branches that are not selected. The system may mirror, fully or partially, the search data from the inception point for each branch that is allowed to continue.

In response to identification of a mismatch and/or an inception point, the system may delete all previous mirrored data. At the inception point, the system may mirror the search data to create a new copy and start a new mirrored search. Deleting all mirrored search data following each mismatch may reduce the burden on system memory.

The mirroring may switch between a full mirroring and a partial mirroring. For example, a full mirroring of data may be performed initially for a first query. If the hash values match for a predetermined duration, the mirroring may be automatically switched to a partial mirroring to save resources. The mirroring may be switched from a partial mirroring to a full mirroring in some circumstances, such as where excessive branching is encountered. Alternatively, a partial mirroring may be performed initially and the mirroring may be switched to a full mirroring.

The enhanced speed and capacity of a quantum computing system may enable substantially continuous hashing of both the original query and the copies at the quantum computing system in mirror mode. Performing a partial mirroring, rather than a full mirroring, and only performing a hashing on data that has been partially mirrored, may also reduce a burden on the processor, whether the hashing is performed by the standard processor or the quantum processor. The substantially continuous hashing may be performed in real time. The reduction in the burden on the resources on a classical computer, such as on the processor, may allow the computer resources to focus on other activities, such as detecting fraud.

Due to the enhanced speed of a quantum computing system, it is possible that the mirroring of a search using AI processing on a classical computer onto a quantum computing system may proceed much faster. In this situation, a limit may therefore be placed on the speed of the AI processing for mirroring on the quantum computing system.

The quantum computing system may include multi-dimensional scaling. The query may be routed to a quantum processor having a default number of quantum threads. Each quantum thread may include a default number of quantum circuits.

The system may automatically scale the quantum processor during mirror mode operation. The scaling may include adding additional quantum circuits to each quantum thread when a task is detected to have a duration that is longer than a threshold duration. The scaling may include adding additional quantum threads when a task is detected to have a volume that is larger than a threshold volume.

Determination of the inception point, determination of the number of copies, identification of likely branches, scaling of the quantum processor, and/or any suitable operations may be carried out by one or more artificial intelligence/machine learning (AI/ML) algorithms.

A mirror mode operation may initiate a quantum circuit. A quantum circuit may include one or more qubits and quantum gates. A group of qubits may be referred to as a quantum register. The quantum gates may perform operations that manipulate the quantum states of the qubits.

In mirror mode, the quantum processor may simultaneously analyze each copy with its assigned qubits. The analysis may be carried out by any suitable algorithm or algorithms including one or more algorithms that use qubit superposition and entanglement properties.

Mirror mode operations may produce an output with hash values, hash value comparisons, identification of inception points, number of mirrored copies, number of branches and/or any suitable outputs. The outputs may be a result of "viewing" or "measuring" the qubits or quantum registers, collapsing a quantum probability into a discrete output (generally 0 or 1). This viewing or measuring may take place multiple times per second. The output may be digital data. The output may be displayed on a graphical user interface. The output may be transmitted to a different computer or a different part of the computer system for further analysis or computations.

Mirror mode operations may compare hashes from one copy to another copy of the data or may compare hashes from every copy of the data to every other copy of the data. Partial mirror mode may compare hashes for segments that have been mirrored. For example, the analysis may include comparing a first hash of search data to a second hash of search data. A qubit-based processor may compare the data exponentially faster than a standard microprocessor.

In some embodiments, the system may include instructions executed by a standard (non-qubit) processor on a computer system. The computer system may be the same computer system that includes the quantum processor. The standard processor may manage quantum processor operations through one or more AI/ML algorithms. Managing may include directing full or partial mirroring of search data, selecting a hashing algorithm to apply to the search data, efficiently running the quantum processor, analyzing the outputs, and/or any other suitable function.

An AI/ML manager of the quantum-based analysis may be necessary as the outputs may be too large or arrive too fast for a human operator to manage efficiently. The AI/ML algorithms may be trained using simulated training data or real world data. The AI/ML algorithms may be trained on the output iteratively. The AI/ML algorithms may be suitable for quantum processors.

In some embodiments, the quantum processor may include one or more Toffoli gates, Hadamard gates, and/or any suitable quantum logic gate.

One or more non-transitory computer-readable media storing computer-executable instructions are provided. When executed by a processor on a computer system, the media may perform a method for remediating an AI hallucination at a quantum processor in a quantum information system.

The method may include receiving a query from a user and executing an AI search. The AI search may output AI search data. The method may include activating a mirror mode on a quantum processor. The mirror mode may fully or partially mirror the AI query and execute a mirrored AI search. A partial mirrored AI search may output a partially mirrored AI search data.

The method may include, at a series of time stamps, generating a first hash value from the AI search data and a second hash value from the mirrored AI search data. The method may include determining whether the first hash value and the second hash value are identical. When the hash values are not identical, the method may include terminating the AI search and deleting the mirrored AI search data.

The method may include identifying the latest time stamp when the hashes are identical and reinitiating the AI search from the latest time stamp. The method may include generating a new mirrored copy of the AI search data at the latest time stamp.

A computer system may include both a standard processor and a quantum processor. The method may include receiving the query at the standard processor. The method may include initializing a quantum circuit at the quantum processor and operating a hashing algorithm at the quantum circuit. The hashing algorithm may continuously hash the AI search data and the mirrored AI search data for the duration of the AI search. When the AI search is complete, the method may include collapsing the quantum circuit. The quantum processor may have N qubits, where N is a number between two and ten thousand. The continuous hashing algorithm may utilize a superposition property of the N-qubit processor.

The method may include using one or more AI/ML algorithms to determine whether the hashes were identical. The method may include using one or more AI/ML algorithms to identify the last point when the hashes are identical.

In some embodiments, the hashes may be compared at a series of time stamps. Intervals in the series of time stamps may be determined based on user input. Intervals in the series of time stamps may be determined by one or more AI/ML algorithms. Intervals between the time stamps may be reduced so that the hashing is substantially continuous. For example, hashes may be computed millions of times per second.

The method may include, when the hashes are not identical, applying the AI search data to train the AI search algorithm.

In some embodiments, the method may include generating more than one mirrored copy of the query and executing multiple mirrored AI searches.

In some embodiments, the hashes may not be identical due to branching that exceeds a branching factor. The latest time stamp may include a plurality of branches. The method may include selecting a set of branches from the plurality of branches based on analysis of the branch content and the query. The method may include mirroring the search data for each branch in the set of branches before reinitiating the search.

The quantum processor may include a default number of quantum threads. Each quantum thread may include a default number of quantum circuits. The method may include automatically scaling the quantum processor in the mirror mode. The method may include adding quantum circuits to each quantum thread when a processing task is detected to have a duration that is longer than a threshold duration. The method may include adding quantum threads when the processing task is detected to have a volume that is larger than a threshold volume.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for mirror mode operations as described herein.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
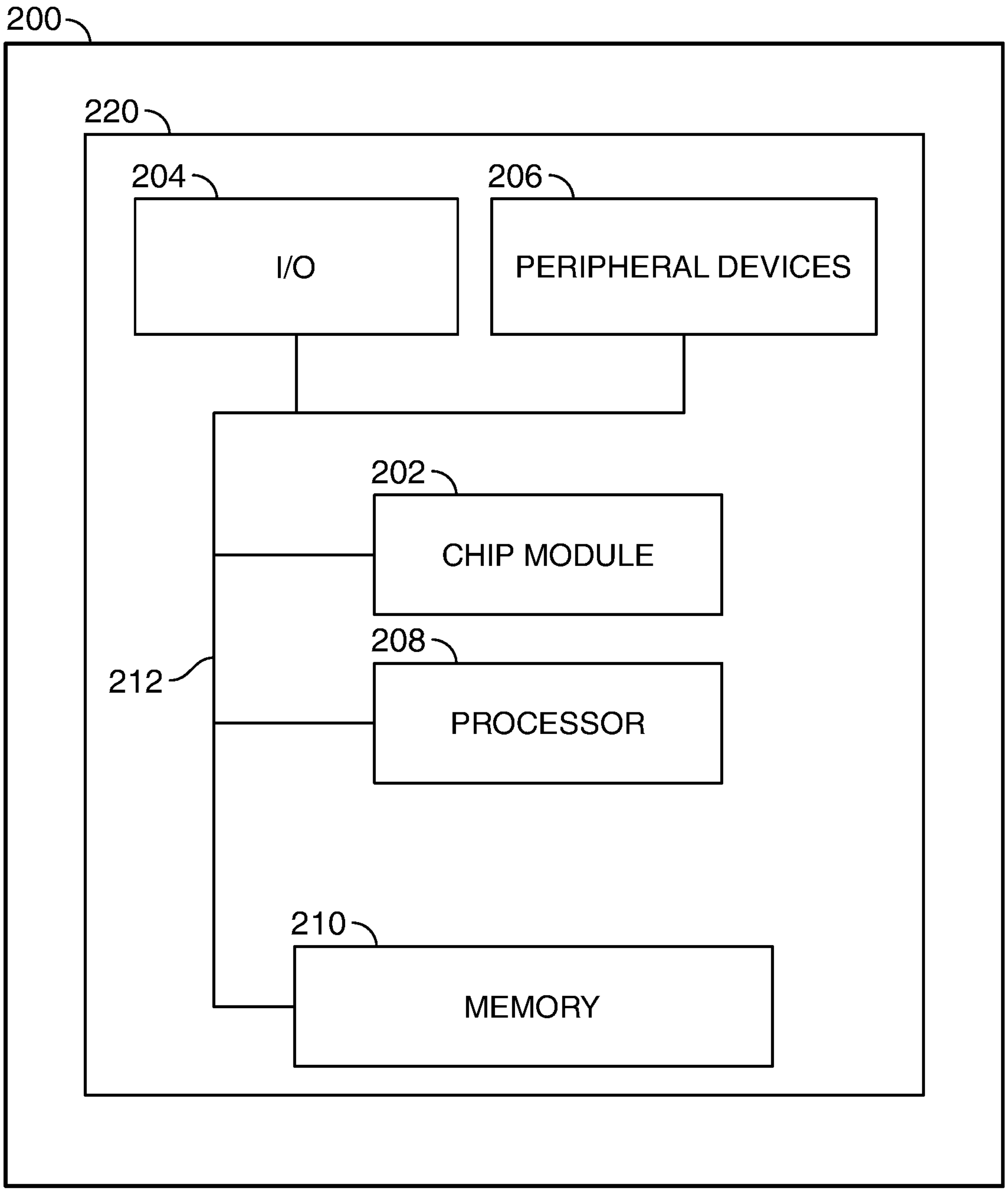
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
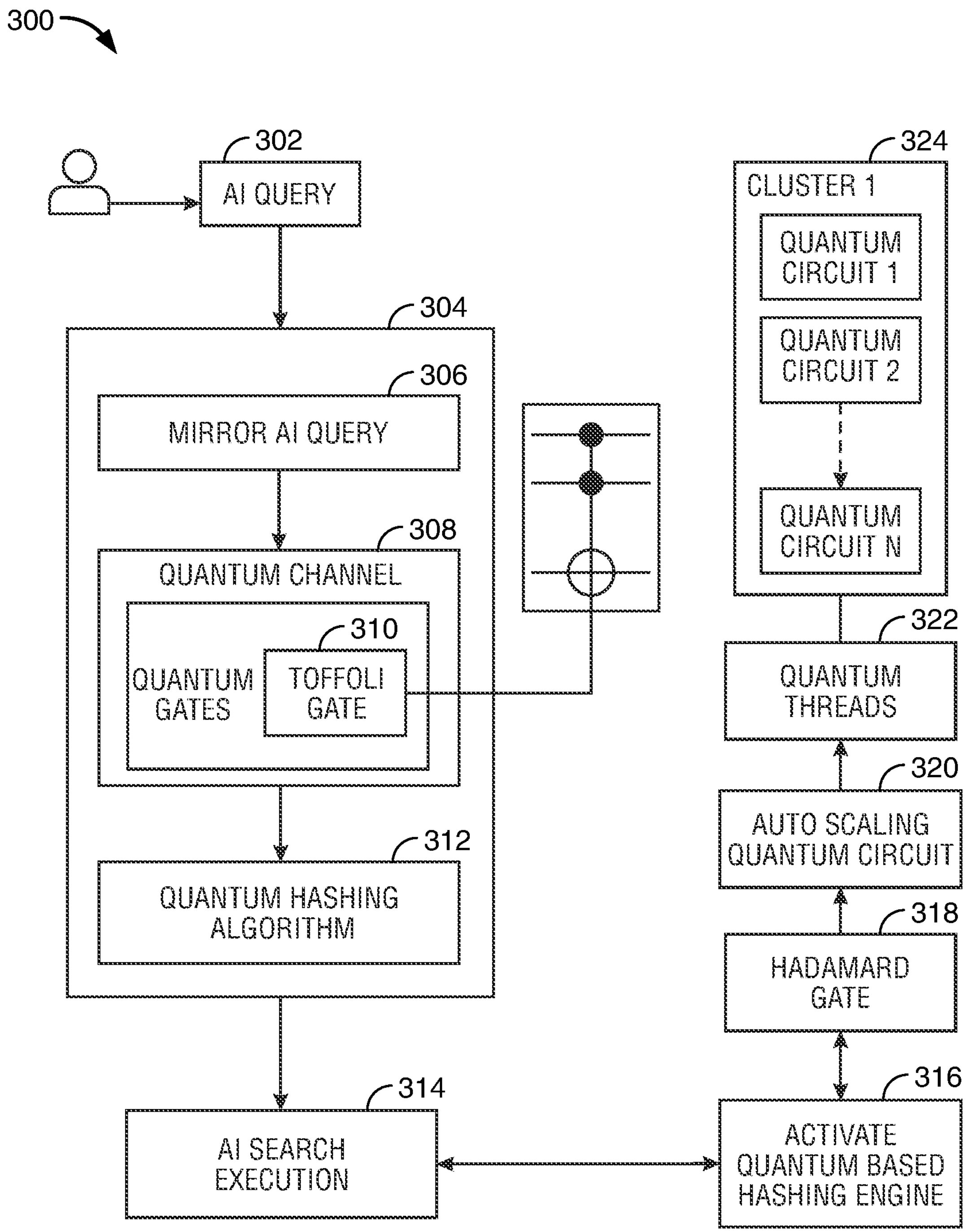
FIG. 3 shows an illustrative diagram in accordance with principles of the disclosure.

FIG. 3 shows illustrative diagram 300 in accordance with principles of the disclosure. Diagram 300 shows architecture and process steps of a quantum computing powered system with multi-dimensional scaling for remediating an AI hallucination.

A search request or query may be received by an AI interface at 302. The query may be generated by an AI prompt. The query may be transmitted to an AI interface by another device, such as by a user at a user device. At 304, mirror mode may be activated. In mirror mode 304, the system may duplicate the query for a parallel AI search. The query may be duplicated fully or partially. Mirror mode 304 may route the AI search data to quantum channel 308, which may include Toffoli gate 310. The system may select quantum hashing algorithm 312. The system may execute the query at 314, at quantum processor 316.

The quantum processor may include Hadamard gate 318. The quantum processor may include automatic scaling 320, wherein the processor may be initialized with a default size that may include a number of quantum threads 322, each thread including a cluster of quantum circuits 324. The scaling may include dynamically adjusting the number of threads and/or circuits based on the present computing task.

Figure 4:
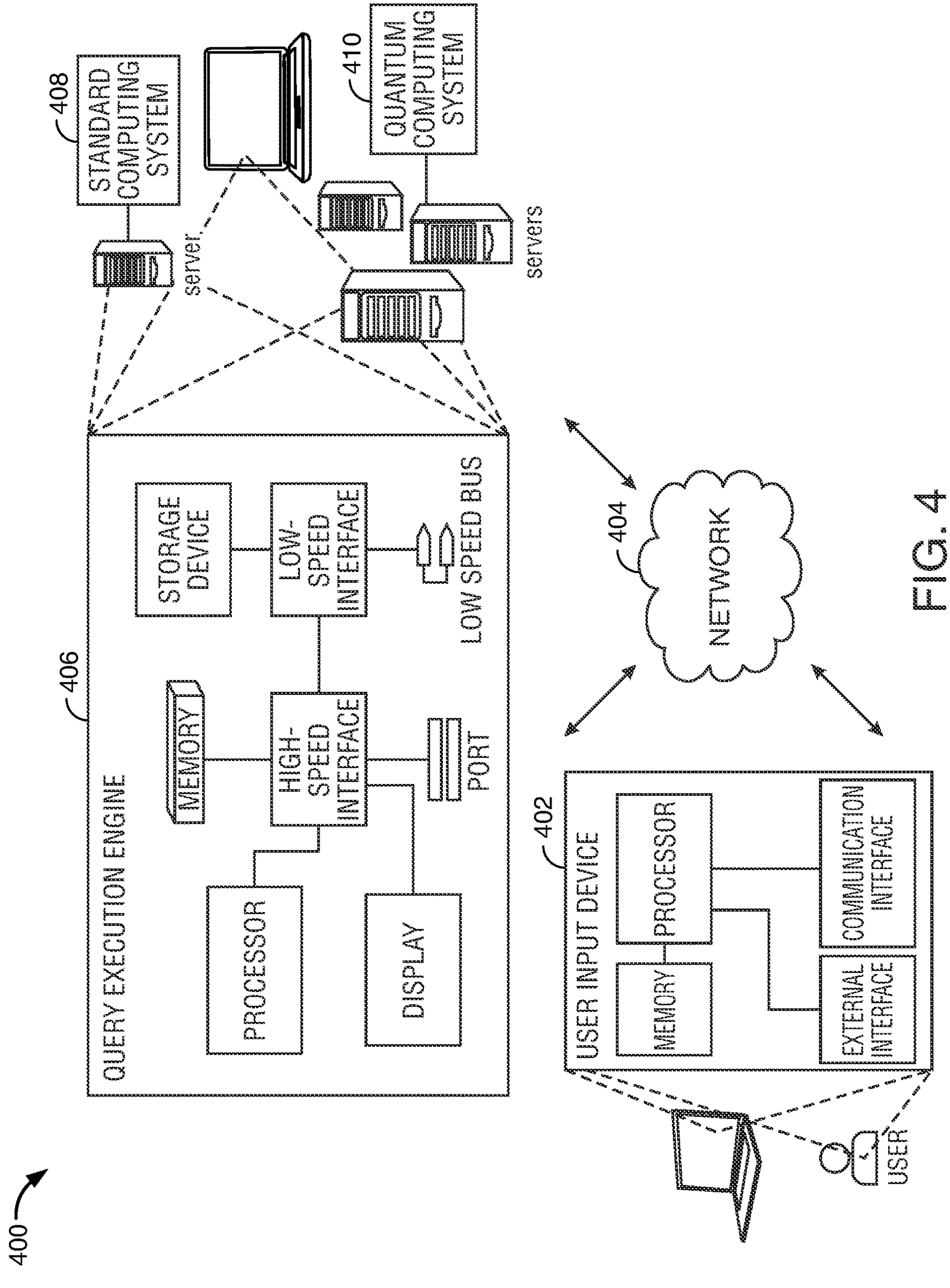
FIG. 4 shows an illustrative diagram in accordance with principles of the disclosure.

FIG. 4 shows illustrative architecture diagram 400 in accordance with principles of the disclosure. Diagram 400 includes user input device 402 and query execution engine 406, some or all of which may be in communication with each other via network 404.

User input device 402 may include a memory, processor, external interface, and communication interface. Execution engine 406 may include a processor, a display, memory, high-speed and low-speed interfaces, connection ports, and suitable memory devices and communication busses. The system may include standard computing system 408 and quantum computing system 410, which may execute queries and various computing tasks according to the methods and configurations disclosed herein.

Figure 5A:
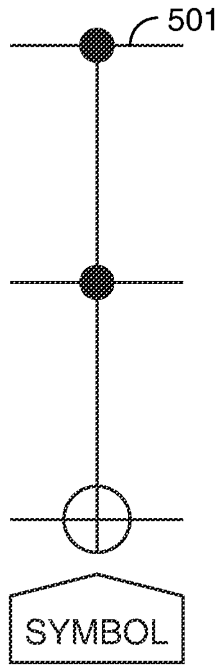
FIGS. 5A and 5B show illustrative diagrams in accordance with the principles of the disclosure.
Figure 5B:
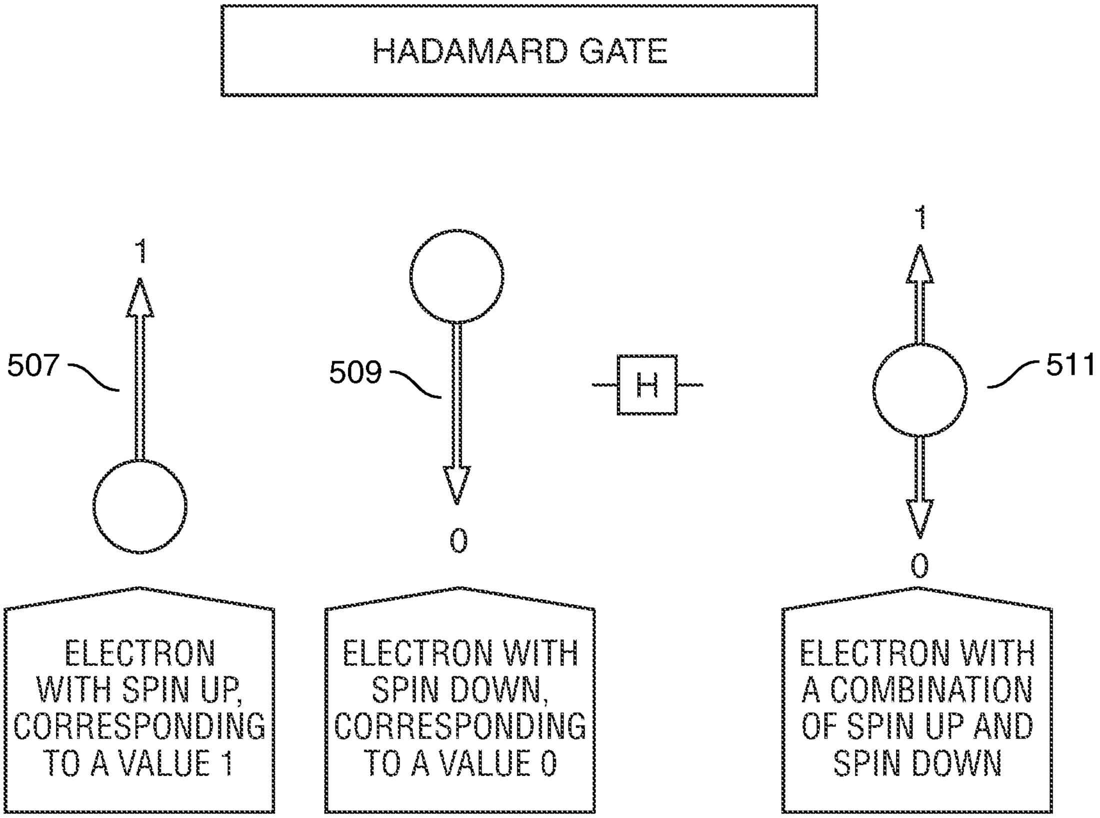

FIG. 5A-5B show illustrative diagrams of exemplary quantum gates in accordance with principles of the disclosure.

FIG. 5A shows symbol 501, matrix form 503, and truth table 505 of a Toffoli gate. A Toffoli gate is a universal reversible logic gate, which means that it enables simulation of any standard reversible circuit. In operation, as seen in truth table 505, the Toffoli gate has a 3-bit input and 3-bit outputs. The first two output bits always mirror the first two input bits. The third bit also stays the same unless the first two input bits are both set to 1-in which case the third output bit is inverted from the third input bit. The Toffoli gate is therefore also known as the "controlled-controlled-not" gate.

FIG. 5B shows representations of a Hadamard gate. Symbol 507 shows a representation of electron spin up, which corresponds to the value 1. Symbol 509 shows a representation of electron spin down, which corresponds to the value 0. Symbol 511 shows a representation of electron spin up and down, which corresponds to the value that represents a superposition of 1 and 0.

Figure 6:
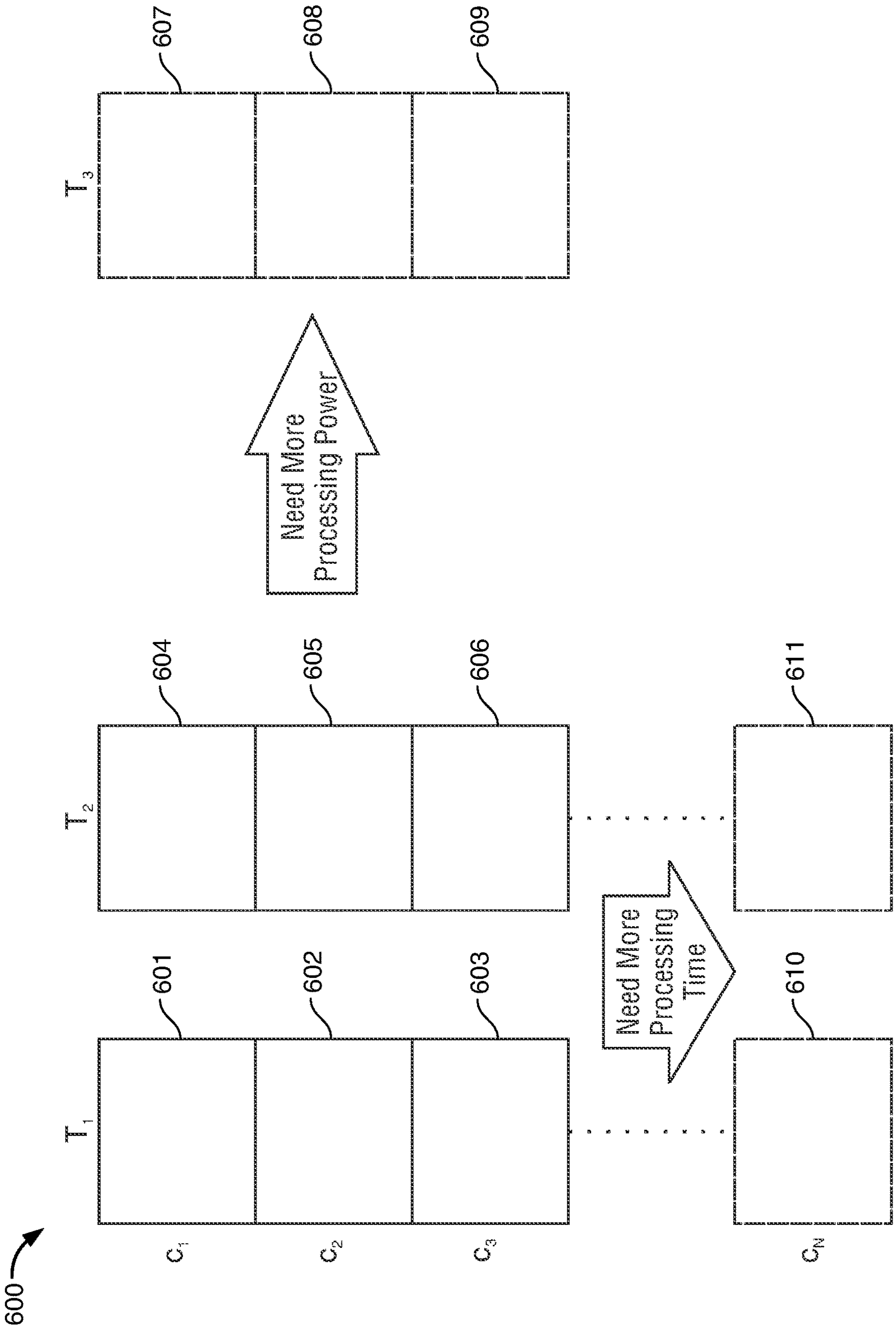
FIG. 6 shows an illustrative diagram in accordance with the principles of the disclosure.

FIG. 6 shows illustrative diagram 600 in accordance with principles of the disclosure. Diagram 600 shows scaling of a quantum processor as disclosed herein. In an illustrative default initialization, the quantum processor may include a first quantum thread T1 that includes quantum circuits 601-603 and a second quantum thread T2 that includes quantum circuits 604-606. When the system detects a need for more processing power, a third quantum thread T3 may be added which may include quantum circuits 607-609. When the system detects a need for more processing time, quantum circuits 610 and 611 may be added to existing threads T1 and T2.

Figure 7:
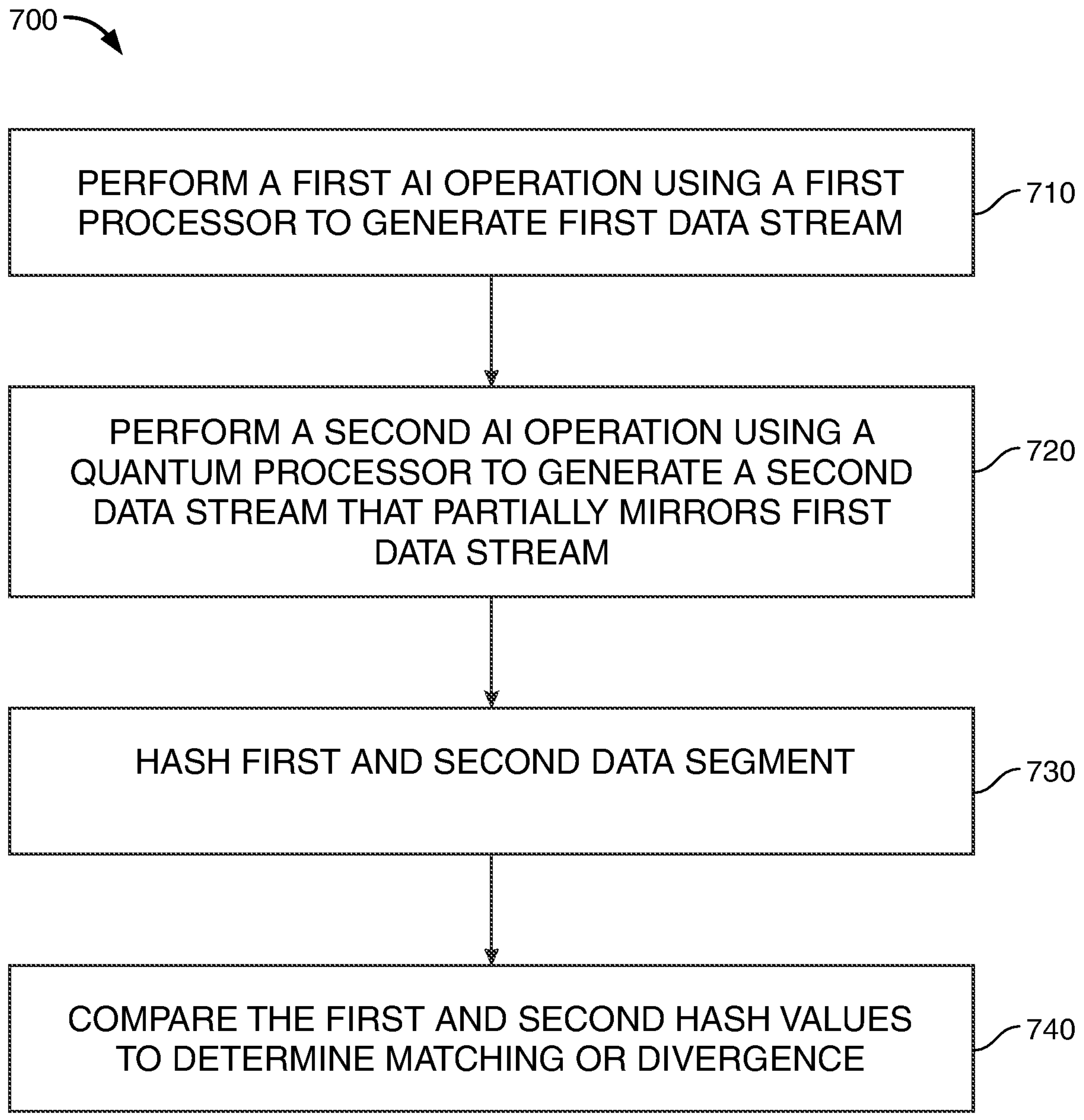
FIG. 7 shows an illustrative process flow in accordance with the principles of the disclosure.

FIG. 7 shows illustrative process flow 700 for monitoring the performance of AI operations by partial mirroring of data in a quantum computing environment. At 710, the system may perform an AI operation using a first processor to generate a first data stream. The AI operation may be performed in response to a first request. The first request may be in the form of a query, such as an AI prompt. The first processor may be a processor at a classical computer or a quantum processor at a quantum computer.

At 720, the system may perform an AI operation using a quantum processor to generate a second data stream. The AI operation may include an AI search. The quantum processor may be the same processor as the first processor or may be a second processor. The AI operation may be performed in response to a second request. The AI operation may be configured to perform a partial mirroring of data segments, which may be in the form of data packets, from the first data stream as segments in the second data stream. The first and second data streams may be stored in a memory. Corresponding segments in the first and second data streams may be identified based on an indicator, such as a time stamp.

At 730, a first hash value of a segment in the first data stream and a second hash value of a corresponding segment in the second data stream may be generated for multiple data streams. At 740, the first and second hash values may be compared. If the hash values match, the system may determine that the data streams are being correctly mirrored and the AI operations at both processors are being performed consistently. If the hash values do not match, the system may attempt to determine the cause of the mismatch. For example, the mismatch may be the result of an AI hallucination, or the mismatch may indicate that the AI operation may generate different possible results, such as branching, which may be excessive. A limited amount of branching may be acceptable, and a particular branch may be selected for use. However, excessive branching in which too many branches are generated may need to be controlled.

Figure 8:
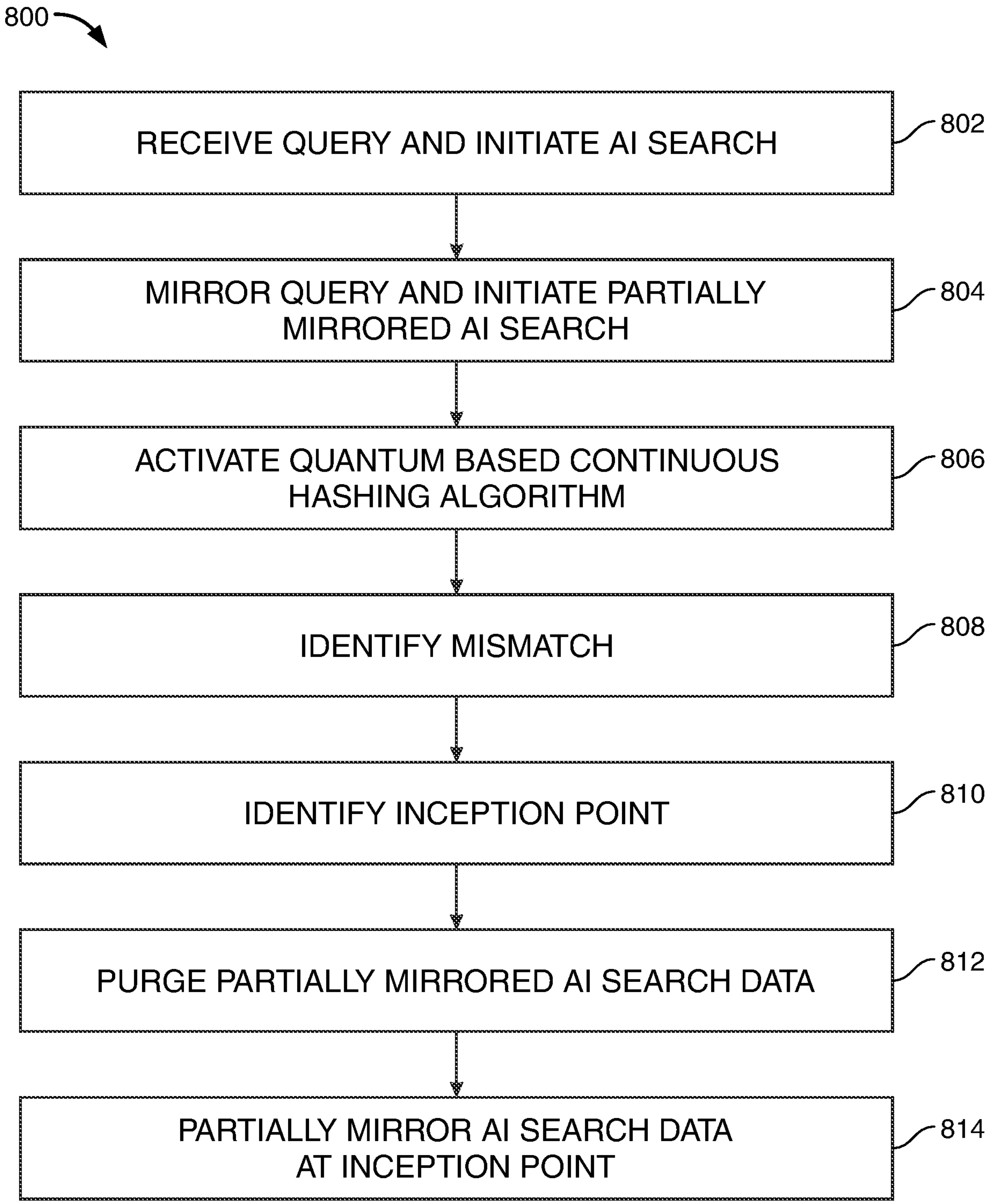
FIG. 8 shows an illustrative process flow in accordance with the principles of the disclosure.

FIG. 8 shows illustrative process flow 800 for remediating an AI hallucination by using a partial mirroring of data in a quantum computing environment. At 802, the system may receive a query at an AI search interface and process the query to initiate an AI search. At 804, the system may activate a mirror mode. In mirror mode, the system may duplicate the query and initiate a partially mirrored AI search. In some embodiments, the system may receive the AI query at a standard processor and activate the mirror mode at a quantum processor. The mirror mode may be configured to perform partial mirroring.

At 806, the system may activate a continuous hashing algorithm. The hashing algorithm may be quantum based. The hashing algorithm may substantially continuously hash the AI search data and the mirrored AI search data and compare the hash values. In some embodiments, the system may activate the mirror mode at a standard processor and activate the continuous hashing algorithm at a quantum processor. At 808, the system may identify a mismatch between the hashes.

At 810, the system may identify an inception point. The inception point may be the last time stamp during the search when the hashes were identical. At 812, the system may purge the partially mirrored AI search data. At 814, the system may reinitiate the partial mirroring of the AI search data at the inception point.

Figure 9:
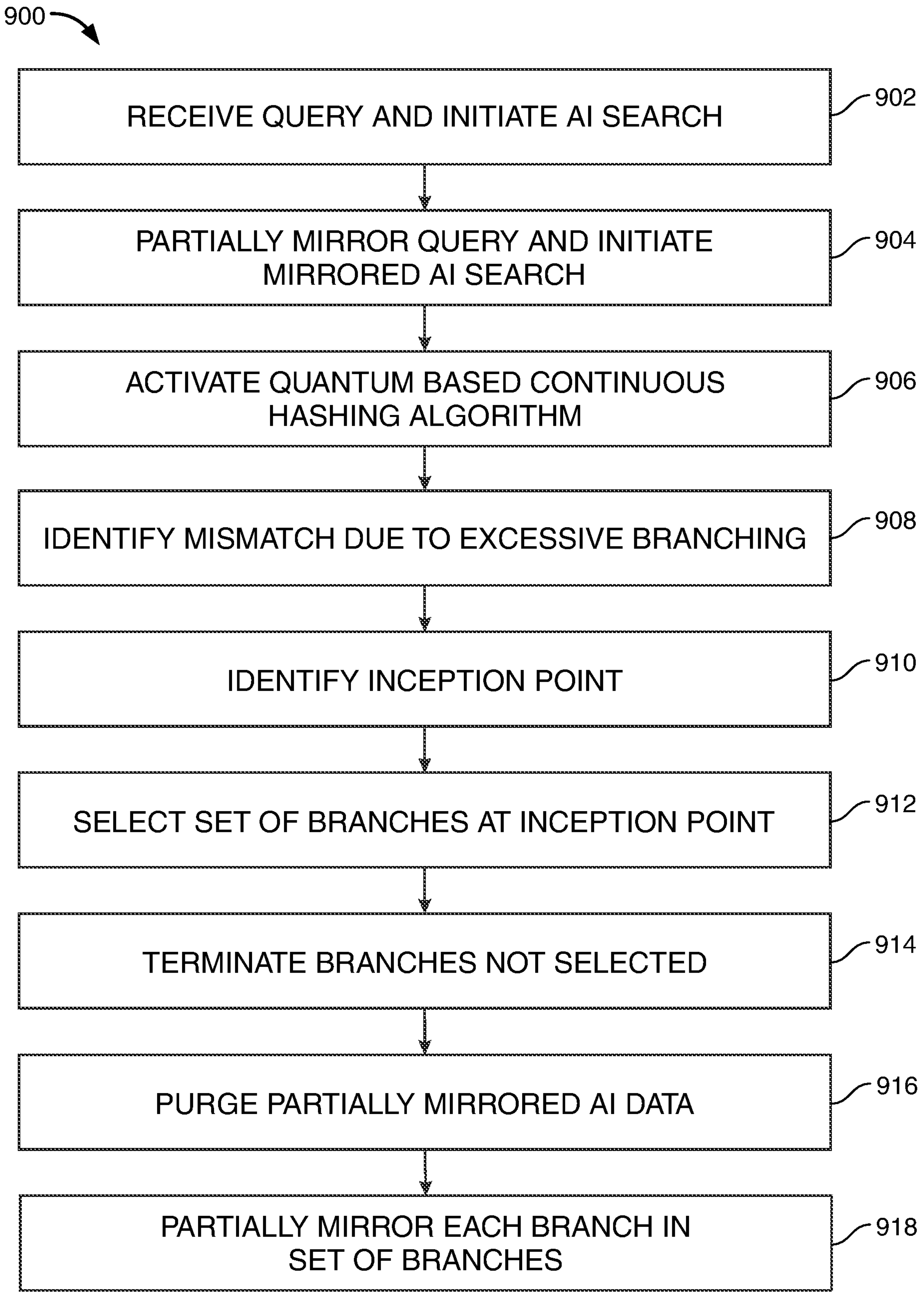
FIG. 9 shows an illustrative process flow in accordance with the principles of the disclosure.

FIG. 9 shows illustrative process flow 900 for remediating excessive branching in an AI search by using a partial mirroring of data in a quantum computing environment. At 902, the system may receive a query at an AI search interface and process the query to initiate an AI search. At 904, the system may activate a mirror mode. In mirror mode, the system may duplicate the query and initiate a partially mirrored AI search. In some embodiments, the system may receive the AI query at a standard processor and activate the mirror mode at a quantum processor. The mirroring may be a partial mirroring mode.

At 906, the system may activate a continuous hashing algorithm. The hashing algorithm may be quantum based. The hashing algorithm may substantially continuously hash the AI search data and the mirrored AI search data and compare the hash values. At 908, the system may identify a mismatch between the hashes. The mismatch may be due to excessive branching.

At 910, the system may identify an inception point. The inception point may be the last time stamp during the search when the hash values were identical. At 912, the system may select a set of AI search branches at the inception point. The branches may be selected based on analysis of the branch outputs and the original query. The branches may be selected using an AI/ML algorithm.

At 914, the system may terminate the branches that were not selected. At 916, the system may purge the partially mirrored AI search data for the terminated branches. At 918, the system may partially mirror each branch in the set of branches at the inception point.

Thus, methods and apparatus for a partial quantum mirror mode for AI models are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for monitoring performance of an artificial intelligence (AI) system by partial mirroring of data in a quantum computing environment, the method comprising:

performing, by a processor using a first AI engine, a first AI operation in response to a first search request to generate a first data stream comprising first data segments;

performing, at a quantum computing system comprising a quantum processor and using a second AI engine, a second AI operation in response to a second search request to generate a second data stream that partially mirrors the first data stream and comprises second data segments that together correspond to less than all of the first data stream;

wherein:

the quantum processor processes data as a plurality of qubits;

the first AI engine and the second AI engine use a same AI model; and each of the first data segments and the second data segments is associated with a respective time stamp; and determining whether one or more of the second data segments are being partially mirrored or are diverging from one or more of the corresponding first data segments in the first data stream by:

hashing a respective one of the first data segments that includes a time stamp to obtain a first hash value;

hashing a respective one of the second data segments that corresponds to the time stamp to obtain a second hash value; and comparing the first and second hash values to determine whether the first and second hash values are matched or mismatched.

2. The method of claim 1, wherein the processor is part of a classical computer.

3. The method of claim 1, wherein the processor is the quantum processor or a second quantum processor.

4. The method of claim 1, wherein a mismatch of the first and second hash values are caused by an AI hallucination.

5. The method of claim 1, wherein the first search request comprises a query received from a user device.

6. The method of claim 1, wherein the first data stream comprises first search results data and the second data stream comprises second search results data.

7. The method of claim 1, wherein, when the first and second hash values are determined to be mismatched, transmitting a prompt to a user device to deactivate further mirroring actions at the quantum computing system.

8. The method of claim 1, further comprising:

when the first and second hash values are mismatched, continuing to partially mirror a portion of the first data stream on the quantum computing system; and designating one or more of the one or more second data segments following the mismatched first and second hash values as a branch of the second data stream.

9. The method of claim 8, further comprising:

mirroring a part of the first data stream a second time to generate a third data stream by performing a third AI operation on the quantum computing system or on a second quantum computing system;

hashing a segment of the third data stream to obtain a third hash value;

comparing the first and third hash values to determine a match or mismatch of the first and third hash values;

when the first and third hash values are mismatched, designating one or more segments in the third data stream as associated with a second branch; and determining by a user device whether to select one of the first or second branches to be reassociated with the third data stream or to discard one or both the first or second branches.

10. The method of claim 1, further comprising:

continuously monitoring for matching or mismatching of the first and second hash values.

11. The method of claim 1, further comprising:

placing one or more limits on the partial mirroring that is performed at the quantum computing system; and controlling the second AI operation based on the one or more limits.

12. The method of claim 1, wherein user access to a first portion of the first data stream is restricted to a category or access level of users, and the partial mirroring of the first AI operation on the first data stream is performed by the quantum computing system only on a second portion of the first data stream that is unrestricted with respect to the category or access level of users.

13. One or more non-transitory computer-readable media storing computer-executable instructions, which, when executed on a processor on a computer system, perform a method for monitoring performance of an artificial intelligence (AI) system by partial mirroring of data in a quantum computing environment, the method comprising:

performing, at a classical computer comprising a first processor, an AI operation using a first AI engine in response to a first search request to generate a first data stream comprising first data segments;

performing, at a quantum computing system comprising a quantum processor, the AI operation using a second AI engine in response to a second search request to generate a second data stream that partially mirrors the first data stream and comprises second data segments that together correspond to less than all of the first data stream;

wherein:

the quantum processor processes data as a plurality of qubits;

the first AI engine and the second AI engine use a same AI model and are configured to perform the AI operation; and each of the first data segments and the second data segments is associated with a respective time stamp;

hashing a respective one of the first data segments that includes a time stamp to obtain a second hash value;

hashing a respective one of the second data segments that corresponds to the time stamp to obtain a first hash value; and comparing the first and second hash values to determine whether the first and second hash values are matched or mismatched; and when the first and second hash values match, continuing to partially mirror on the quantum computing system the one or more of the first data segments in the first data stream, perform hashing on the one or more first data segments in the first data stream and one or more of the second data segments in the second data stream to monitor whether results of the AI operation that is performed at both the classical computer and the quantum computing system are matching or diverging.

14. The media of claim 13, wherein the first data stream comprises first search results data and the second data stream comprises second search results data.

15. The media of claim 13, wherein, when the first and second hash values are determined to be mismatched, transmitting a prompt to a user device to deactivate further mirroring actions at the quantum computing system.

16. The media of claim 13, wherein the method further comprises:

when the first and second hash values are mismatched, continuing to partially mirror a portion of the first data stream on the quantum computing system; and designating one or more of the one or more second data segments following the mismatched first and second hash values as a branch of the second data stream.

17. The media of claim 16, wherein the method further comprises:

mirroring a part of the first data stream a second time to generate a third data stream by performing a third AI operation on the quantum computing system or on a second quantum computing system;

hashing a segment of the third data stream to obtain a third hash value;

comparing the first and third hash values to determine a match or mismatch of the first and third hash values;

when the first and third hash values are mismatched, designating one or more segments in the third data stream as associated with a second branch; and determining by a user device whether to select one of the first or second branches to be reassociated with the third data stream or to discard one or both the first or second branches.

18. The media of claim 13, wherein the method further comprises:

continuously monitoring by the classical computer or the quantum computing system for matching or mismatching of the first and second hash values.

19. The media of claim 13, wherein the method further comprises:

placing one or more limits on the partial mirroring that is performed at the quantum computing system; and controlling the AI operation based on the one or more limits.

20. The method of claim 13, wherein user access to a first portion of the first data stream is restricted to a category or access level of users, and the partial mirroring of the AI operation on the first portion of the first data stream is performed by the quantum computing system only on a second portion of the first data stream that is unrestricted with respect to the category or access level of users.

* * * * *